# United States Patent Office 3,594,246
Patented July 20, 1971

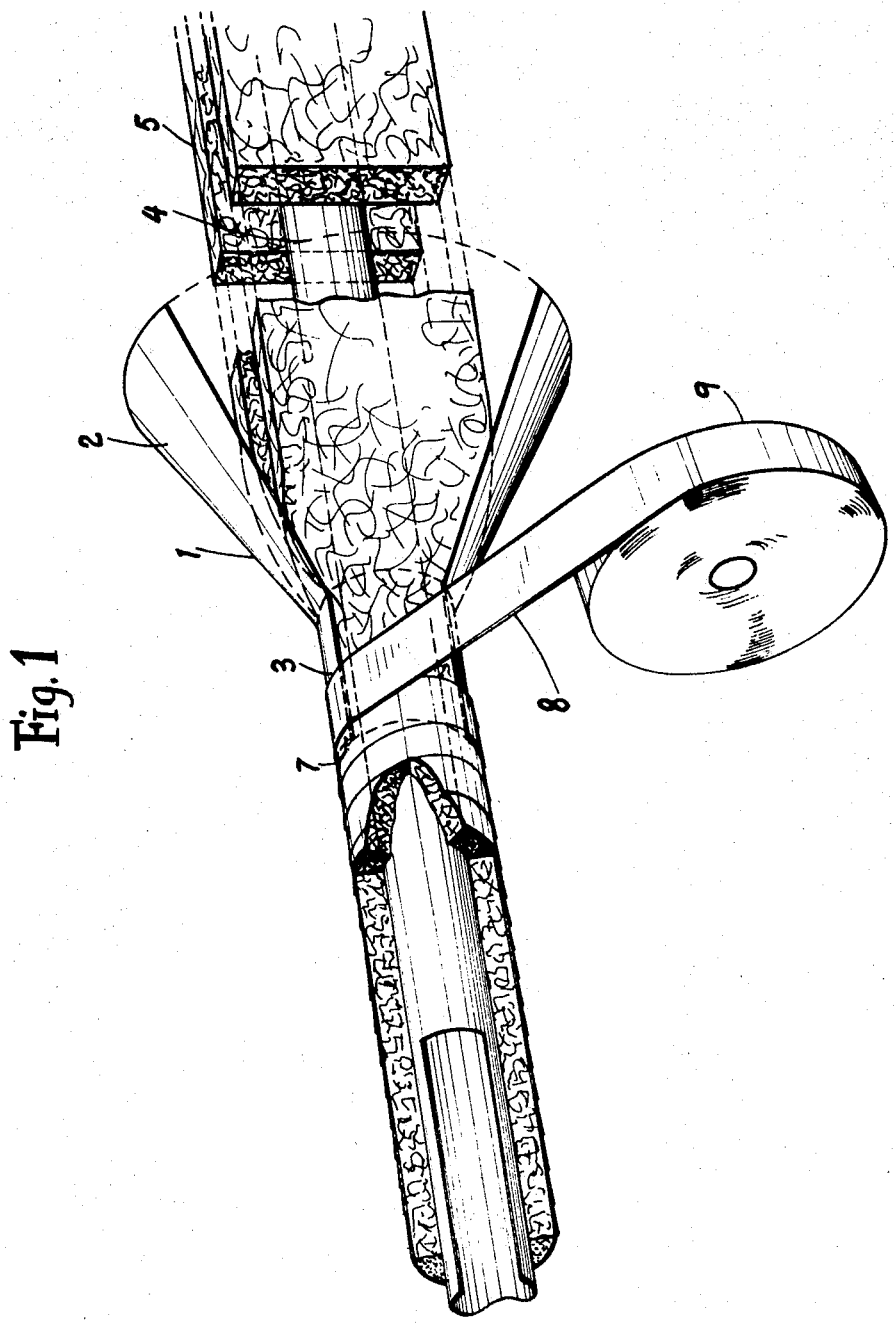

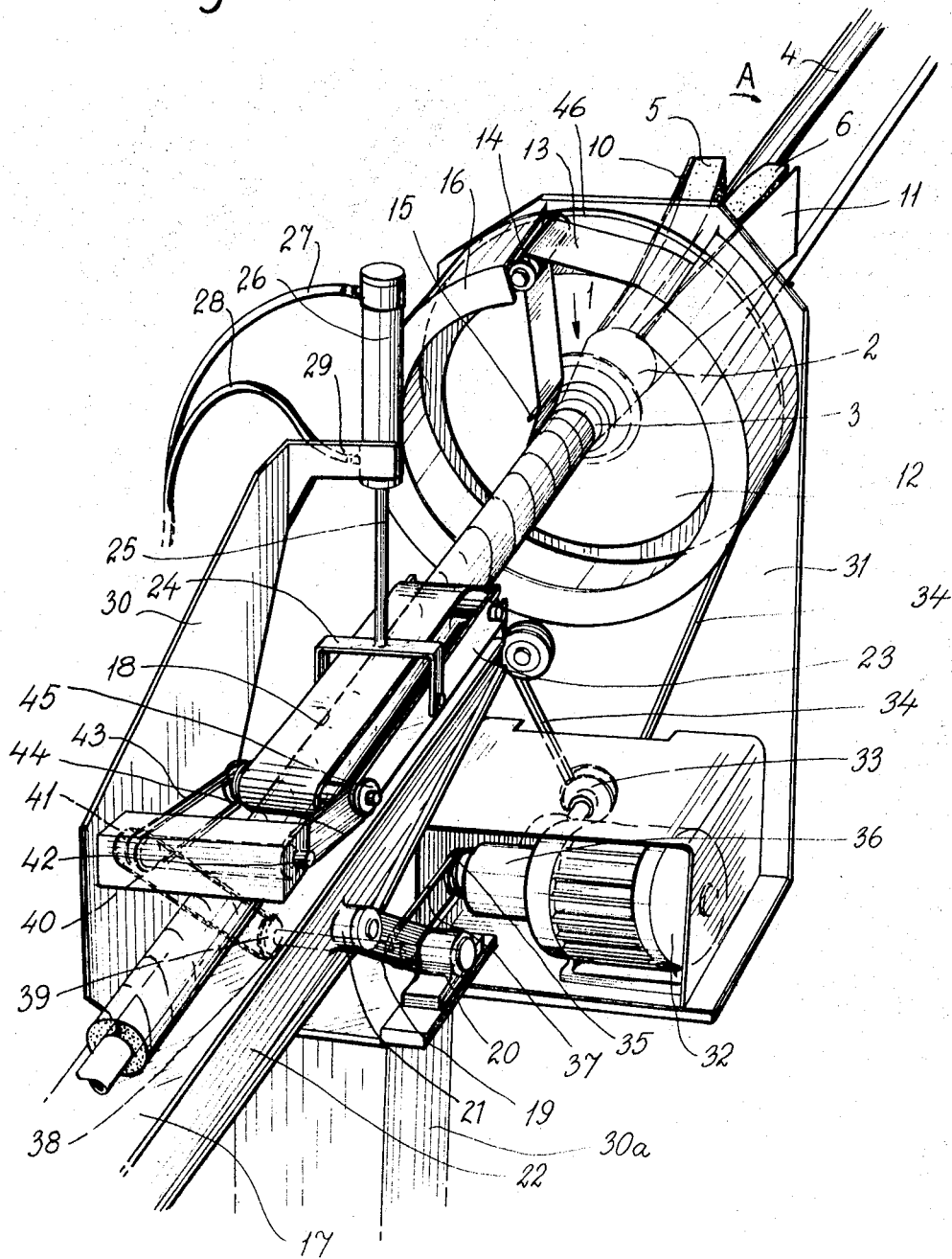

3,594,246
METHOD OF CONTINUOUSLY APPLYING INSULATION TO LENGTHS OF TUBING
Karl Arne Arovelius, Vasteras, Sweden, assignor to Aktiebolaget Svenska Metallverken, Vasteras, Sweden
Continuation of application Ser. No. 584,450, Oct. 5, 1966. This application Jan. 12, 1970, Ser. No. 1,964
Claims priority, application Sweden, Oct. 11, 1965, 13,151/65
Int. Cl. B31c *13/00;* B65h *81/08*
U.S. Cl. 156—162                                                   7 Claims

ABSTRACT OF THE DISCLOSURE

A method and apparatus for wrapping tape or the like in overlapping coils about an insulated pipe or tube wherein the insulated tube is passed through a funnel-like die having a straight outlet extension integral therewith, and the tape is wound partly on the outer end of the outlet exension and partly on the portion of the pipe just leaving said outlet, so that the coils of tape lie in overlapping relationship.

REFERENCE TO RELATED APPLICATION

This application is a continuation of my parent application, Ser. No. 584,450, filed Oct. 5, 1966, now abandoned.

The present invention is concerned with a method of continuously insulating lengths of piping or tubing, preferably with mineral wool, wherein at least one strip of insulating material is advanced together with the tubing or piping, in the longitudinal direction of the same, through a matrix which compresses the insulating material around the circumference of the piping or tubing, and wherein the insulating material is secured to the piping or tubing as soon as it has left the matrix by winding a tape-like material helically around the insulating material in such a way that adjacent loops of tape partly overlap each other.

It has previously been suggested to continuously insulate piping or tubing according to the above disclosed method, the compressed and moulded insulating material, which leaves the matrix together with the tubing or piping being bound with tape. However, this method is accompanied by certain problems which are difficult to overcome. Thus, when the compressed and moulded insulating layer on leaving the matrix is suddenly relieved of the compression forces exerted within the matrix, the material attempts to expand or spring out, radially, and consequently binding of the insulating material to the piping or tubing as it leaves the matrix must be carried out quickly. If the tape is not wound on quickly enough the surface of the insulating material becomes uneven and furthermore, may easily break unless a tape of relatively high mechanical strength is chosen, resulting in an increase in production costs.

These disadvantages, however, are eliminated by means of the invention which is mainly characterized in that the strip of insulating material and the tubing or piping are discharged from the matrix while at the same time the tape is wound onto the tubular portion of the matrix, thus permitting the loops of tape formed to be successively drawn off the tubular matrix by the advancing insulating material, a ratio between the speed at which the piping or tubing leaves the matrix and that at which the tape is wound being maintained; said ratio corresponding to the required pitch, i.e. overlapping of the wound tape.

The invention also relates to an arrangement for carrying out the method, the arrangement being mainly characterized by a matrix through which is passed a tubing or piping, and at least one elongated strip of insulating material, the input side of the matrix being in the form of a hopper and the output side converging into a cylindrical nozzle, means being present which draws the tubing or piping together with the insulating strip linearly through the matrix as well as winding the tape around the cylindrical nozzle.

The invention will now be described with reference to an embodiment of the same shown diagrammatically in the accompanying drawing, additional characterizing features of the invention also being disclosed at the same time.

FIG. 1 illustrates a substantially perspective view, partly in section, of the method according to the invention of continuously providing lengths of tubing or piping with a jacket of insulating material.

FIG. 2 shows a perspective view of an apparatus intended for carrying out the method according to the invention.

Reference is first made to FIG. 1 in which the reference numeral 1 indicates a tubular lead-through die or matrix provided with a rear portion 2 designed in the shape of a funnel, the one side of which has been cut away in the drawing to show the interior thereof, and a front portion which constitutes a substantially circular nozzle 3.

When carrying out the method according to the invention, the tubing or piping 4 to be insulated according to the invention is positioned in such a way that it can be easily inserted into the funnel portion 2 of the matrix. At least one strip of suitable insulating material, mineral wool for instance, is positioned lengthwise along the piping or tubing; two strips of such material, indicated by reference numerals 5 and 6, being shown in the drawing. When this has been done, the tubing or piping together with the two strips of insulating material 5 and 6 are passed through the funnel shaped matrix portion 2, the funnel automatically moulding the strips 5 and 6 around the tubing while at the same time compressing the insulating material as it is fed through the narrow portion of said funnel. The piping or tubing together with the strips of insulating material, moulded around said tubing in the funnel, then passes relatively smoothly into the tubular portion 3 wherein the insulating material is kept compressed during advancement of the piping or tubing. Unless preventative measures are taken, the insulating material will rapidly "expand" radially as the piping or tubing leaves the front edge 7 of the tubular portion 3. However, to prevent this from happening a tape 8 is wound, in a manner characteristic to the invention, onto the outside of the end of the cylindrical portion 3 so that the loops of tape overlap each other whereby a helical sleeve comprised of tape is continuously fed over from the outside of portion 3 onto the outer surface of the insulating material as it appears at the edge 7 of said portion 3. By preparing beforehand a sleeve of tape-like material which is constantly being fed over, onto the insulating material at the same speed as the piping or tubing and insulating material is advanced through the matrix, the insulating material is prevented from expanding, the loops of tape substantially maintaining the shape and compressed state of the insulating material. The tape, shown in the example as it is wound from a roll of tape 9, is assumed to be wound onto the portion 3 while moving the roll of tape in a helical path around said portion 3 in such a way that the loops of tape overlap each other to the required extent.

When carrying out the method according to the inven-, tion a ratio is maintained between the speed at which the piping or tubing and insulating material leave the matrix and the speed at which the tape is wound; the ratio corresponding to the desired pitch, i.e. overlapping of the loops of tape.

It is often necessary to apply a load to the tape when winding the same onto the portion 3; this can be effected by breaking the speed at which the tape leaves the roller 9. To ensure that the process is carried out smoothly, it is important when winding the tape onto the tubular portion 3 to so adapt the distance covered by the tape from the end 7 of the said portion that the resistance, caused by friction, which is applied to the tape being drawn away from the outer surface of the matrix is lower than the friction which exists between the turns of tape already wound onto the insulating material and tubing, and thus prevent the turns from being unfavorably displaced, relative to each other.

When winding the tape onto the tubular portion 3 it has proved necessary to wind at least a portion of said tape in front of the end 7 of the portion 3 of the matrix, which thus means that this portion is wound directly onto the insulating material leaving the matrix, contributing to the fact that the tape material is automatically entrained forward in the linear direction of feed by said insulating material.

According to the invention the tape may be of many different kinds of material, such as fabric, paper—particularly creped kraft paper-plastic, metal—more specifically aluminum foil—and metal fabric.

In certain applications of the invention it may be an advantage to use adhesive tape, i.e. tape which enables at least the contacting portions of the loops of tape overlapping each other to stick together. It is thus possible to supply the tape with an adhesive as it is benig wound. The adhesive can be applied to the tape externally, at least along the edges which overlap.

When the piping or tubing, together with the insulating material has been taped, it can be coated with a moisture repelling material, thereby obtaining improved insulating properties. The product, for instance, can be covered externally with a layer of plastic.

An apparatus suitable for carrying out the method will now be described by way of an example with reference to FIG. 2 which shows the tubing or piping 4 and the two strips 5 and 6 of insulating material being guided into the funnel portion 2 of the matrix 1. To facilitate guiding of the piping or tubing, guide plates 10 and 11 are arranged, which converge towards the funnel 2. As in FIG. 1 the funnel 2 is provided at its narrow portion with a tubular portion 3 out of which the insulating material, compressed in the funnel, is discharged together with the enclosed tubing or piping. Mounted coaxial with the matrix 2, 3 is an individual, pivotable roll 12 of tape, a loop 13 passing over a guide roller 14 down over the matrix portion 3 while being guided and possibly tensioned by a guide member 15 adapted to guide the tape so that it obtains a helical winding path over the portion 3. The guide roller is mounted at the inner periphery of a cylindrical protection cover 16 and is coaxially rotatably mounted around the shaft of the matrix 2, 3 and as the guide roller rotates, the tape 13 is wound around the portion 3, the aforementioned helical sleeve of overlapping loops of tape being formed on said portion 3. Optimal winding of the tape is effected by arranging braking means to prevent the roll 12 of tape from rotating too freely, i.e. so that tension is maintained in the tape. In this way sufficient friction between the loops wound on the insulating material is obtained. The linear advancement of the tubing or piping under the insulating material is caused by an arrangement of firstly a lower conveyor belt 17 or the like, and secondly an upper conveyor belt 18. The lower conveyor belt is pivotally arranged in a number of pairs of links 19, of which only one is shown in FIG. 2, said links being mounted firstly in brackets 20 and secondly in bearing attachment points 21 in the frame proper 22 for the lower conveyor belt. The links 19 are assumed to be arranged in pairs at each bearing point along the long conveyor 17. The whole of the lower conveyor 17 can thus be raised and lowered into and out of engagement position relative to the advanced tubing or piping 4, provided with a jacket of insulating material and a sleeve of tape. The upper conveyor 18 is in principle comprised of two parallel longitudinal rails 23 of which only one is shown in FIG. 2, the two rails 23 being connected by means of a stirrup 24 which can be raised and lowered by means of a piston rod 25 operating in a hydraulic or pneumatic cylinder 26 which is provided with delivery conduits 27 and 28 for the pressure fluid. This cylinder 26 is secured to an arm 29 which projects inwardly from a stationary frame portion 30, which is part of a supporting frame 30a.

A suitable electric motor 32 is arranged to operate the entire apparatus, said motor driving, via a gear (not shown), a driving wheel 33 which drives, via a belt drive 34, a belt wheel secured on a plate 46 rotating within the protection shield 16. The plate 46 is thus driven in the direction of arrow A by means of the belt drive 34 at a suitable reduction ratio. Driven from an additional drive wheel 35, from another gear 36 on the motor 32, via a belt 37 is a shaft 38 which in turn, via a drive wheel 39 and a belt 40 via a drive wheel 41 drives a shaft 42 pivotally mounted in the frame portion 30. This shaft 42 in turn drives the shaft 45 via the belt drive 43, the shaft 45 constituting the driving shaft of the conveyor belt 18 and the upper conveyor.

When the lower conveyor 17 is swung upwards and rests on its links 19 and the upper conveyor 18 is depressed by means of the piston 25 to the position where it engages the tubing or piping leaving the matrix provided with the insulating material and tape, the insulated tubing or piping while being guided by the conveyors is fed forward at a speed which is coordinated with the speed at which the plate 46 rotates and in this way it is possible to insulate continuously tubing or piping of arbitrary lengths.

Regarding the nozzle, it is expedient according to the invention, to design that portion of the matrix referred to as the tubular matrix portion lying behind the effective winding zone so that it is slightly conical, in the forward direction, to prevent the tape from slipping backwards. Further, the wall thickness of the tubular portion of the matrix should be slight, at least at the discharging end and it may often be advantageous to make the edge almost knife sharp.

I claim:

1. A method of continuously applying insulation to lengths of tubing comprising advancing at least one strip of insulating material together with tubing in the longitudinal direction of the latter through a stationary die which compresses the insulating material around the circumference of the piping, and securing the insulating material to said tubing as soon as the same has left the die by winding a tape-like material helically around the insulating material such that adjacent loops of tape partly overlap each other, the strip of insulating material and the tubing being discharged from the die while the tape is wound at the same time partly onto a tubular portion of the die and partly onto the advancing tubing and insulating material, thus permitting the loops of tape formed to be successively drawn off the tubular portion of the die solely by the pulling action of the advancing insulating material, applying tension to the tape while it is wound onto the tubular portion of said die and positioning said tape such that the tape is tightly wound on said tubular portion of the die in the immediate proximity of the discharge end thereof to bridge said discharge end and the advancing insulating material as the latter pulls the tape therefrom to prevent expansion of the compressed insulating material, and maintaining a ratio between the speed at which the piping leaves the die and that which the tape is wound to produce a required pitch of overlapping of the wound tape.

2. A method according to claim 1, wherein the distance covered by the tape from the discharge end of the tubular portion of the die is such that the total frictional resistance against the tape being pulled off the surface of said die is lower than the total friction existing between the turns of tape already wound onto the insulating material.

3. A method according to claim 1, wherein a portion of the tape is wound in front of the discharge end of the tubular portion of the die directly onto the discharged insulating material.

4. A method as claimed in claim 1, wherein the tape has an adhesive thereon.

5. A method as claimed in claim 1 comprising applying an adhesive onto the tape as it is being wound.

6. A method according to claim 1 comprising applying an adhesive onto the external surface of the tape at least at the overlapping edges thereof.

7. A method according to claim 1 comprising applying an external coating of a plastic moisture repellant substance onto the pipe with the insulating material and tape thereon.

References Cited
UNITED STATES PATENTS

| | | | |
|---|---|---|---|
| 2,200,257 | 5/1940 | Bogoslowsky | 156—162X |
| 2,339,121 | 1/1944 | Van Cleef | 156—162 |
| 3,490,972 | 1/1970 | Rogers | 156—162 |
| 3,511,729 | 5/1970 | Williams | 156—187X |
| 3,519,519 | 7/1970 | Basso | 156—430 |
| 3,524,779 | 8/1970 | Masters et al. | 156—190 |
| 1,676,351 | 7/1928 | Robinson. | |
| 1,988,628 | 1/1935 | McDonald et al. | |
| 3,259,533 | 7/1966 | Philipson. | |

HAROLD ANSHER, Primary Examiner

U.S. Cl. X.R.

138—144; 156—187, 191, 195, 215, 392, 425, 428